(12) United States Patent
Boucadair et al.

(10) Patent No.: US 8,174,965 B2
(45) Date of Patent: May 8, 2012

(54) SERVICE MANAGEMENT IN A NETWORK

(75) Inventors: Mohamed Boucadair, Rennes (FR);
Yoann Noisette, May sur Orne (FR)

(73) Assignee: France Telecom, Paris (FR)

(*) Notice: Subject to any disclaimer, the term of this patent is extended or adjusted under 35 U.S.C. 154(b) by 109 days.

(21) Appl. No.: 12/525,581

(22) PCT Filed: Jan. 21, 2008

(86) PCT No.: PCT/FR2008/050085
§ 371 (c)(1),
(2), (4) Date: Oct. 2, 2009

(87) PCT Pub. No.: WO2008/107597
PCT Pub. Date: Sep. 12, 2008

(65) Prior Publication Data
US 2010/0034079 A1    Feb. 11, 2010

(30) Foreign Application Priority Data
Feb. 6, 2007    (FR) ...................................... 07 00830

(51) Int. Cl.
*G01R 31/08* (2006.01)
(52) U.S. Cl. .......................... 370/218; 370/217; 370/244
(58) Field of Classification Search ........................ None
See application file for complete search history.

(56) References Cited

U.S. PATENT DOCUMENTS

| | | | | |
|---|---|---|---|---|
| 7,821,923 B2* | 10/2010 | Kakadia et al. | ................ | 370/221 |
| 7,849,127 B2* | 12/2010 | Lindem et al. | ................ | 709/201 |
| 7,860,990 B2* | 12/2010 | Mallesan et al. | ............... | 709/230 |
| 2006/0274649 A1* | 12/2006 | Scholl | ........................... | 370/218 |
| 2007/0076591 A1* | 4/2007 | Khan | ............................ | 370/216 |

(Continued)

FOREIGN PATENT DOCUMENTS

| CN | 1 870 689 A | 11/2006 |
|---|---|---|
| WO | WO 2006/128147 A2 | 11/2006 |

OTHER PUBLICATIONS

Hardwick, "Session Border Controllers—Enabling the VoIP Revolution," Data Connection Limited, Enfield, UK, retrieved from internet website: http://www.dataconnection.com/network/download/whitepapers/sessionbordercontroler.pdf, pp. 1-55 (Feb. 2005).

(Continued)

*Primary Examiner* — Donald Mills
(74) *Attorney, Agent, or Firm* — Drinker Biddle & Reath LLP

(57) ABSTRACT

In a network (10) providing a service to a client of a terminal (T1) and comprising at lease first and second session border controllers (A, B), at least one identical address (@Ain) is allocated to the first and second session border controllers. A router (Ra) connects the terminal (T1) to the first session border controller (A) and is capable of dynamically managing a routing table indicating at least first and second routes for the address. A message transmitted from the terminal to the network is received at the first session border controller when the router selects the first route and at the second session border controller when the router selects the second route.

9 Claims, 5 Drawing Sheets

U.S. PATENT DOCUMENTS

| | | | |
|---|---|---|---|
| 2007/0160058 A1* | 7/2007 | Zhou et al. | 370/395.2 |
| 2008/0144605 A1* | 6/2008 | Qiu et al. | 370/352 |
| 2008/0219268 A1* | 9/2008 | Dennison | 370/395.2 |
| 2009/0196183 A1* | 8/2009 | Kakadia et al. | 370/237 |

OTHER PUBLICATIONS

Hautakorpi et al., "Requirements from SIP (Session Initiation Protocol) Session Border Control Deployments; draft-ietf-sipping-sbc-funcs-00.txt," SIPPING Working Group, Internet-Draft, pp. 1-24 (Nov. 24, 2006).

Katz et al., "Bidirectional Forwarding Detection; draft-ietf-bfd-base-05.txt," Network Working Group, Internet Draft, pp. 1-44 (Jun. 2006).

Spencer et al., "IAX2: Inter-Asterisk eXchange Version 2; draft-guy-iax-02, Work in Progress," Internet Draft; pp. 1-110 (Oct. 23, 2006).

* cited by examiner

SERVICE MANAGEMENT IN A NETWORK

CROSS-REFERENCE TO RELATED APPLICATIONS

This application is the U.S. national phase of the International Patent Application No. PCT/FR2008/050085 filed Jan. 21, 2008, which claims the benefit of French Application No. 07 00830 filed Feb. 6, 2007, the entire content of which is incorporated herein by reference.

BACKGROUND OF THE INVENTION

The present invention relates to a service on IP (Internet Protocol), in particular to IP telephony called "Voice over IP".

IP telephony advantageously allows, on the one hand, a reduction of the cost of telephonic communications in comparison with conventional telephony and, on the other hand, the coupling of telephony with the functions and services of data processing and of IP networks.

A telephony service is a real time service which requires a relatively high level of availability and robustness. In the context of conventional telephony (STN for 'Switched Telephone Network'), based on circuit switching, this level of robustness and availability is obtained by the use of methods which are not applicable to IP telephony, which is not based on circuit switching.

An IP network providing a telephony service conventionally comprises a service platform, as well as equipment for accessing the service, or POPs (Points Of Presence), which are in charge of managing the access of user client terminals to the service in question.

In standard fashion, these POPs are associated with Border Session Controller (BSC) equipment (also known as Session Border Controller (SBC) equipment), whose principal functions have been identified in the document 'Requirements from Session Initiation Protocol Session Border Control Deployments', by J. Hautakorpi et al., draft-ietf-sipping-sbc-funcs-00.txt, November 2006. These SBCs are situated between the client terminals and the platforms of the IP telephony service. An SBC is in general situated in a POP for access to the IP network (without this however being a necessary condition for the functioning of the telephony service) and represents, for a given client terminal, a unique point of entry to the telephony service. Such management of access to a service makes it possible to mask the service platform and, more generally, the network architecture used by an operator, from the client terminals. It is then possible to guarantee service impregnability.

SBCs correspond to a point of passage both for the signalling flows, aimed at establishing a communication, and for the media flows which pass between the client terminals. Signalling flows can encompass the establishment of a communication, for example based on protocols such as SIP (Session Initiation Protocol), or also H.323, as defined by the ITU-T (International Telecommunication Union Telecommunication Standardization Section), or also IAX (Inter-Asterisk eXchange Version 2) as defined in the document draft-guy-iax-02, Work In Progress, October 2006 by Spencer, Shumard, Capouch and Guy. As for the media flows, these can be exchanged between client terminals according to protocols of the RTP (Real-Time Transport Protocol) type, or even the IAX type.

An SBC therefore receives, on the one hand, signalling messages from the service platform, or from the client terminals respectively. Then, after processing these messages, the SBC relays them to the client terminals, or respectively to the service platform.

Then, when a media flow is exchanged from a first client terminal to a second client terminal of the service, which are associated with a first and a second SBC respectively, this media flow is received at the first SBC, then relayed to the second SBC, the latter then being in charge of transmitting this media flow to the second client terminal. By proceeding thus, the client terminals cannot communicate directly with each other, the impregnability of service thus being guaranteed.

It can also be noted that the SBCs can also provide other functions such as a filtering function or an address translation function for services based on the IPv4 protocol.

Thus by virtue of their role in an IP telephony network, SBCs appear to be potential concentration nodes for failures that can lead to a breakdown in the service provided to clients whose terminals would be managed by an affected SBC.

In order to increase the failure resistance in such a network and robustly and efficiently convey the signalling messages making it possible for communications to be established, as well as conveying the media flows between the client terminals, backup SBCs are provided conventionally, so that it is possible to substitute a backup SBC for a defective SBC. Such an architecture requires the backup SBC to have a configuration and behaviour identical to the SBC which it replaces, both in terms of client terminals and service platform.

The term 'network' is understood to refer not only to the network layer, i.e. layer 3, of the OSI (Open System Interconnection) model, but also to any interconnection between different items of equipment.

However, providing such backup equipment has many drawbacks.

Firstly, SBC duplication within a POP is costly, particularly since SBCs are increasingly in charge of different functionalities. This solution also represents an additional service cost, requiring in particular a separate electrical supply and technical rooms with a larger surface area.

Furthermore, failure detection and the management of a switchover from a defective SBC equipment to a backup SBC conventionally rely on proprietary mechanisms from the manufacturer of this equipment which as a result are generally not mutually compatible.

Moreover, the larger the number of SBCs attached to a service platform, the higher the maintenance cost, as well as the cost associated with maintaining the synchronization between the possibly defective SBC on the one hand, and the backup SBC or SBCs on the other hand.

SUMMARY OF THE INVENTION

The purpose of the present invention is to improve the situation.

A first aspect of the present invention proposes a method for managing a service provided to a user of a terminal in a network comprising at least first and second session border controllers (SBC), at least one identical address being allocated to the first and second session border controllers, a router connecting the terminal to the first session border controller and being capable of dynamically managing a routing table indicating at least first and second routes for said address, wherein a message transmitted from the terminal, intended for said network address is received at the first session border controller when the router selects the first route and at the second session border controller when the router selects the second route.

The second route can be selected at least on detection of a malfunction of the first session border controller, it being understood that it is possible to envisage triggering the selection of the second route in situations other than a malfunction of the first SBC.

In the context of the present invention, by the term 'malfunction' of a session border controller is understood a problem which affects the normal operation of the session border controller such that this controller can no longer carry out its function of managing communications or sessions for the client terminals attached to the corresponding POP. Such a malfunction can also be called a 'failure' hereafter.

According to one of the advantages obtained by the invention, it is then possible to switch messages transmitted from a client terminal, which is managed by the first session border controller when the latter is operational, over to the second session border controller, based on a particular address allocation within the network in question. In this context, advantageously, the second controller can be a session border controller in charge of the session management for certain other client terminals. Thus, it is not necessary to install a specific backup SBC for each SBC of the network. In such an architecture, a main SBC, i.e. an SBC which is in charge of the session management for client terminals, can also become a backup SBC for another main SBC of the same network. Such a feature makes it possible to avoid the drawbacks mentioned above which are associated with the installation of a specific backup SBC. In particular there is no extra cost associated with the installation of a backup SBC.

It should be noted that a router activating a dynamic routing protocol is capable of updating its routing table(s) based on routing information regularly received from different elements of the network, via messages which are referred to below under the terms 'routing announcements'.

Such a router, which can be termed an access router, is also capable of selecting a best route when several routes to a single destination are available (based on information stored in its routing table). Such a selection can be made based on selection criteria taking into account parameters assisting in route selection, such as priority levels or also weightings (also known as administrative weights) which are allocated to the different routes for a given single address. In this context, it is simple to arrange for the router connected to the first session border controller to update the selection assistance parameters relating to the different routes depending on changes which can occur in the network, based on existing routing mechanisms.

On the basis of routing rules which are well known to a person skilled in the art, addresses are allocated to the SBCs as main SBCs, i.e. in a normal operational mode, such that the router selects the first route, the one which leads to the main SBC, when the main SBC is operational.

No limitation is placed on the means used for detecting a malfunction of the first session border controller.

It can in particular be provided that the router and the first controller respectively implement a similar routing protocol. Thus, a single routing protocol is activated on the interface which links the router and the first controller. In this case, the detection of a malfunction of the first session border controller can then be carried out based on routing information exchanged according to these routing protocols.

Thus advantageously, the first session border controller cooperates with the router, as it then manages one instance of the routing method.

In a variant, the router implements a failure detection method, such as for example a protocol of the BFD (Bidirectional Forwarding Detection) type, defined in particular in the document draft-ietf-bfd-base-05, June 2006 by D. Katz, and the detection of a malfunction of the first session border controller is carried out based on this detection method.

It can also be envisaged to combine the two variants described above.

In an embodiment of the present invention, the network comprises a whole number N of session border controllers. Each of these controllers manages a whole number M of client terminal groups, M network addresses being respectively associated with the M groups of terminals. The set of these M network addresses is allocated to each of the session border controllers. The routing table of the router gives N routes for each of the M addresses.

In this context, a message transmitted from the terminal to the network is received at the first session border controller when the router selects the first route and at another session border controller, as second session border controller, from the N-1 other session border controllers when the router selects one of the N-1 other routes, as second route, one of the N-1 other routes being for example selected on detection of malfunctioning of the first session border controller.

Here, the access router of each session border controller has N routes in its routing table and is therefore able to select one of these routes.

Such a configuration advantageously makes it possible to put in place a failure management of the first session border controller in a distributed operation mode. In fact, by distributing the different client terminals managed by a single SBC within M groups, and by allocating a single set of M addresses to each of the N SBCs of the network in question, it is possible, in the case of a malfunction of the first controller, to distribute the load of managing the client terminals of the first SBC onto the N-1 other SBCs of the network. Thus, it is possible to avoid an overload which could occur when all the client terminals of the first session border controller are switched over onto another single session border controller.

This distributed mode is based on the same principles as those disclosed above in the context of the first and the second SBC.

It should be noted that it can be advantageous to distribute the SBC of a network over a plurality of SBC groups, allowing the management mechanism disclosed above to be independently applied within each SBC group.

Such an SBC group distribution can be advantageous in particular in the case where the network comprises a large number of SBCs.

It should be noted that in order to control the load distribution on a particular SBC different from the first SBC, it is possible to put in place an engineering strategy based on a specific management of the metrics, i.e. the distances which separate two items of network equipment, in a number of "hops".

In a network of this type, before requesting a session or a communication, a client terminal carries out its registration. Thus, a registration request is transmitted by the client terminal to the first session border controller. This registration is then transmitted to the service platform, which then registers the data relating to this client terminal, allowing it to manage the service requested by the latter.

When the registration of a client, via a terminal, with the first session border controller is followed by a switchover of SBC from the first SBC to the second SBC, it is then possible for the terminal to transmit a call initiation request as the first message received by the second SBC from this client terminal. In this case, it is provided, in an embodiment of the present invention, to carry out the following steps at the session border controller level:

/1/ receiving a call initiation message as the first message from the client terminal;

/2/ transmitting a specific error message to the terminal; and

/3/ receiving a message registering the terminal with said session border controller.

Thus, when the second session border controller receives a call initiation request from a terminal which has not yet registered with it, it transmits a specific error message which informs the terminal that a prior registration is required.

In standard fashion, a client of a terminal regularly re-registers with the service on expiry of a registration timer, using a 'REGISTER' type message of the SIP protocol for example. According to an embodiment of the present invention, when the main SBC is not operational at the time when a client terminal re-registers, the registration message is sent to the backup SBC. The latter can then handle this message according to standard mechanisms.

Further, it is possible to envisage the case where the switchover of the main SBC to the backup SBC is carried out between the transmission of a registration message and a call initiation message. In this case, no registration of this client terminal with the SBC which acts as a backup SBC has taken place before the call initiation. The backup SBC then transmits a specific error message to the client terminal, for example by inserting a specific error code (to be defined by IANA (Internet Assigned Numbers Authority)). The description of this error code can be of the type: "User not registered. Please register first" Then, on receiving this specific error message, the client terminal triggers a registration phase.

The switchover from the SBC which acts as backup SBC to the main SBC for the client terminal in question, when the latter is again operational, can be managed in a similar manner.

According to standard mechanisms, when the client terminal registers with the backup SBC, the service platform is then informed of this switchover and updates its data accordingly. Thus in the outgoing direction, i.e. from the IP network to the client terminals of the network, the service platform can then route the media flows to the client terminals of the main SBC via the backup SBC.

However, in the period during which the main SBC is not operational and the service platform data have not been updated, the media flows are routed to the client terminals via the main SBC and can be lost as a result. It should be noted that this period generally has a relatively short duration, and more precisely less than 60 seconds.

Moreover, it is advantageous to configure the re-registration timer to a value less than or equal to a period of time for which a client terminal can remain unobtainable in the output direction without the communication being cut off.

In an embodiment of the present invention, a specific address is allocated to the second session border controller, and the following steps are implemented at the level of the second session border controller:

/a/ receiving a call initiation message from the client terminal;

/b/ transmitting an information message to the client terminal giving said specific address;

said following messages transmitted by said client terminal being sent to said specific address.

Such a characteristic can be advantageous as in general it is preferable for the client terminals to use, in the incoming direction, i.e. from the client terminals to the service platform, an address which does not alter during communication, for sending media flows. However, if it is provided to use a main address for the transmission of media flows, and that during a call, the failed SBC once again becomes operational, the media flows are then re-routed to this main SBC. In this case, the main SBC receives media flows that it is not able to process and the communication can be cut.

Under these conditions, the specific address can advantageously be intended to be used for the transmission of media flows in order to avoid such a drawback. The use of an address dedicated to the transmission of media flows can thus be provided, this address being different from the addresses used for the signalling, in order to avoid cutting off calls which are in progress, in the case of a switchover from the backup SBC to the main SBC.

A similar processing can advantageously be implemented for subsequent requests relating to a session which was initiated on the backup SBC. In fact, in order to avoid subsequent requests for such a session being re-routed to the main SBC during the switchover from the backup SBC to the main SBC according to an embodiment of the present invention, the client terminals can advantageously use this specific address for the transmission of these subsequent requests. The backup SBC can use existing mechanisms of the SIP protocol, for example, to inform the client terminals of this use of a specific address.

A second aspect of the present invention proposes a session border controller in a network providing a service to a terminal. The network comprises moreover at least one other session border controller (SBC), at least one identical address being allocated to said session border controllers, in the incoming direction.

This network also comprises a router, called an access router, which connects the terminal with the session border controller and which is capable of dynamically managing a routing table indicating at least first and second routes for said address.

In this session border controller, a message transmitted from the terminal to said network address is received at the session border controller when the router selects the first route and at the other session border controller when the router selects the second route.

In an embodiment of the present invention, the session border controller implements a routing protocol compatible with a routing protocol of the router.

It can be provided that the session border controller comprises the following means:

/1/ means for receiving a call initiation message as the first message from the client terminal;

/2/ means for transmitting a specific error message to the terminal; and

/3/ means for receiving a message registering the terminal with said session border controller.

A third aspect of the present invention proposes a terminal capable of using a service provided in a network, said terminal being capable of transmitting a registration message to a service address of said network and managing a registration timer, the registration message being retransmitted on expiry of said timer, said terminal also being capable of re-transmitting said registration message on receiving a specific error message received from the network.

Such terminal can moreover be capable of transmitting a signalling message establishing a session to the service address, and transmitting data and subsequent signalling messages to a specific address different from the service address.

A fourth aspect of the present invention proposes a computer program intended to be installed in a session border controller according to the second aspect of the present invention, comprising instructions suitable for implementing the method according to the first aspect of the present invention, during an execution of the program by processing means of the session border controller.

A fifth aspect of the present invention proposes a computer-readable recording medium on which the computer program according to the fourth aspect of the present invention is recorded.

A sixth aspect of the present invention proposes a computer program intended to be installed in a session controller according to the third aspect of the present invention, comprising instructions suitable for implementing the method according to the first aspect, during an execution of the program by processing means of the terminal.

A seventh aspect of the present invention proposes a computer-readable recording medium on which the computer program according to the sixth aspect of the present invention is recorded.

BRIEF DESCRIPTION OF THE DRAWINGS

The invention will also be better understood with the help of the drawings, wherein.

In these figures, only the signalling flows are represented.

DETAILED DESCRIPTION OF THE INVENTION

Figure 1:
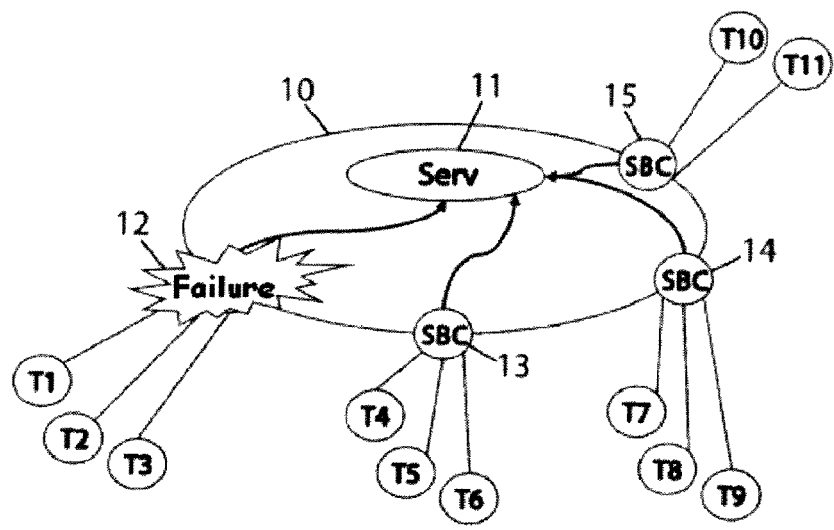
FIG. 1 illustrates a telecommunications network according to an embodiment of the present invention.

FIG. 1 indicates the situation of a malfunction, or failure, at the level of an SBC 12 in an IP network 10 comprising a service platform on IP 11, marked Serv, as well as a plurality of SBC 12-15 which are respectively attached to different POPs of the IP network 10. This network is capable of supplying a service, which can be in particular a telephony service, to the client terminals T1 to T11. The present invention can advantageously be implemented in any network providing any telecommunications service, in particular a service which requires constraints similar to those required for telephony.

The access to the network of the client terminals T1 to T3 is managed by the POP to which the SBC 12 is attached, that of the client terminals T4 to T6 is managed by the POP to which the SBC 13 is attached, that of the client terminals T7 to T9 is managed by the POP to which the SBC 14 is attached and that of the client terminals T10 and T11 is managed by the POP to which the SBC 15 is attached.

Hereafter, by "main SBC" is understood, in relation to a given client terminal, the SBC attached to the POP in charge of managing the access to the IP network 10 of this client terminal.

By "backup SBC" is understood, in relation to a main SBC, an SBC in charge of taking over the functions of said main SBC in case of failure or of malfunction of the latter according to an embodiment of the present invention. No limitation is placed on the present invention with regard to the POP to which the main SBC and the corresponding backup SBC are respectively attached, the respective POPs can correspond to a single POP or also they can be different.

In an embodiment of the present invention, the IP routing is a dynamic routing, such as for example a routing based on a protocol of the OSPF ("Open Shortest Path First") type or ISIS ("Intermediate System to Intermediate System") type, or also a protocol of the BGP ("Border Gateway Protocol") type.

Each SBC of the network 10 is attached to an access router which connects the IP network 10 to the client terminals. These access routers implement the dynamic routing. When several routes are stored in the routing table for a single address, these routers are capable of selecting one of these routes on the basis of route selection rules.

In the incoming direction, i.e. from the client terminals to the service platform 11, each SBC has one main address, as well as a secondary address in the case where it is provided for this SBC to act as a backup SBC for another SBC of the network 10, this secondary address corresponding to the main address of the SBC for which it acts as a backup SBC.

In the outgoing direction, i.e. from the IP network 10 to the client terminals of the network, each SBC has an output address which is a different address for all the SBCs of the network 10.

In an embodiment of the present invention, it is provided that a main SBC for given client terminals of the network 10 has a backup SBC different from this main SBC, a backup SBC also moreover being a main SBC for other client terminals and thus itself having a backup SBC different from the main SBC for which it acts as a backup SBC. This mode of operation is referred to hereafter as "unilateral mode". In such a unilateral mode of operation, the following addresses are associated with the SBC X when the SBC Y is the backup SBC of the SBC X:

@Xin: the main address;
@Yin: the secondary address; and
@Xout: the output address.

Moreover, it is also provided to allocate a specific address @IP_RTPX intended to be used for the transmission of media flows, in order to avoid that, in the case of a switchover from the backup SBC to the main SBC during a call, when the main SBC becomes operational once again, the media flows are not lost.

This specific address @IP_RTPX can advantageously also be used for subsequent requests relating to a session which was initiated on the backup SBC in order to avoid subsequent requests for such a session being lost during the switchover from the backup SBC to the main SBC according to an embodiment of the present invention. The backup SBC can use existing mechanisms of the SIP protocol, for example, to inform the client terminals of this use of a @IP_RTPX address.

The client terminals of the POP to which the SBC X is attached use only one address, for signalling, which is the main address @Xin, which ensures that the service is impregnable.

Figure 2:
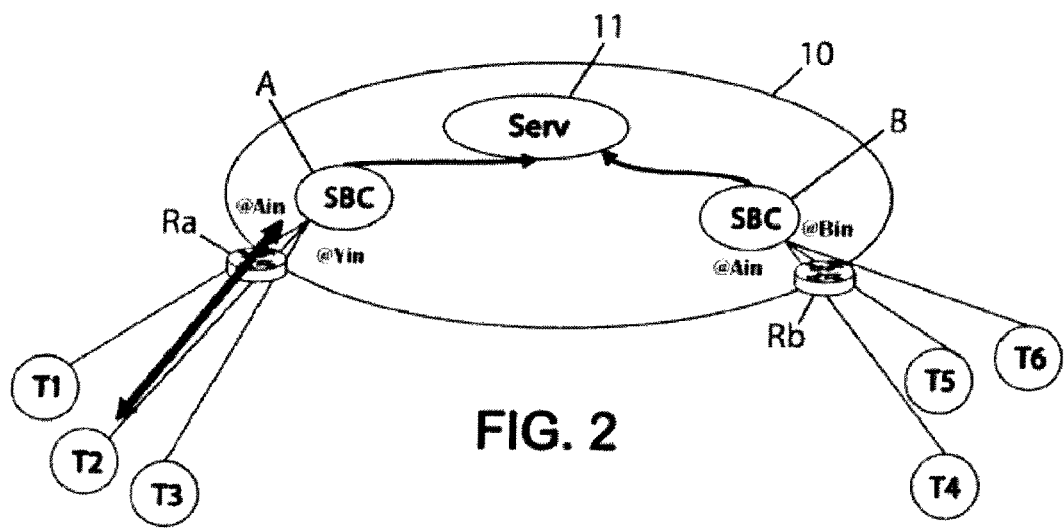
FIGS. 2 and 5 indicate a service management in a unilateral operating mode of the invention.

FIG. 2 indicates such an address management in the IP network 10, comprising SBCs A and B, in the case where SBC B is the backup SBC of SBC A. Here, the main address of SBC A, marked @Ain, is allocated both to SBC A and to SBC B, as a secondary address for the latter, on its client terminal-side interface in the incoming direction. The main input addresses @Ain and @Bin are respectively used by the client terminals of SBC A and SBC B, T1 to T3 and T4 to T6. A router Ra is attached to SBC A and a router Rb is attached to SBC B.

When SBC A and B are operational, the router Ra has in its routing table, in relation to the address @Ain, a first route which leads to SBC A and a second route which leads to SBC B.

Preferably, the main addresses are respectively allocated to the different SBCs of the network, according to a system well known to a person skilled in the art, such that, when SBC A is operational, the connecting router Ra which corresponds to it, selects the first route.

In a variant of the network configuration in unilateral mode, it can be provided for SBC A to have two backup SBCs, or even more, for example SBC B and an SBC C (not indicated in FIG. 2). To each of these two backup SBCs B and C is allocated the main address of SBC A configured on its interfaces in the incoming direction, as secondary address.

In the routing announcements that the SBC B and the SBC C make in relation to their secondary address, different respective weights can be allocated such that, for example, in case of failure of SBC A, the router selects from the routes attached to the main address of SBC A, that which leads to SBC B. In this case, it is only if SBC B has also failed, that the route leading to SBC C is then selected so that SBC C can provide the backup function of SBC A.

Figure 5:
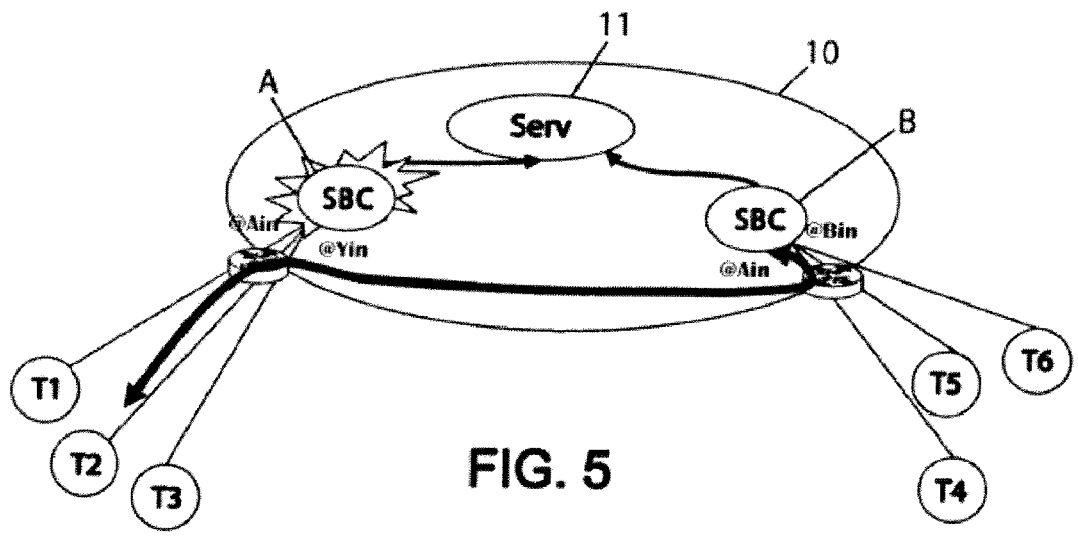

FIG. 5 indicates the application of an embodiment of the present invention when a failure takes place at SBC A in a configuration similar to that indicated in FIG. 2.

When SBC A is operational, the first route is allocated a priority level higher than that allocated to the second route leading to this same address @Ain, but which leads to SBC B. As a result, the routing process selects the route which leads to SBC A.

Following failure of SBC A, the route to the address @A wherein leads to SBC A is removed from the IP routing process of the router Ra. Thus, the route corresponding to this address @A wherein then has the highest priority level, is that leading to SBC B, to which the secondary address @Ain has been allocated.

Thus, in case of failure or malfunction of SBC A, the messages transmitted by users T1, T2 and T3 are routed to reach SBC B.

In a variant which is referred to subsequently as a bilateral mode of operation, it can be provided to organize the SBCs in pairs, each one being the backup SBC to the other, and vice-versa.

In this context, in the incoming direction, the SBCs of a single pair have a single main address. In the outgoing direction, each SBC has an output address different to the output addresses of the other SBCs of the network.

Thus, for the pair of SBC A and SBC B, there are:
for SBC A: @IP_ABin as main address, @IP_RTPA as media flow address, and @Aout as output address, and
for SBC B: @IP_ABin as main address, @IP_RTPB as media flow address, and @Bout as output address.

Only the main address is provided to the client terminals attached to the POP of the SBC in question.

Figure 3:
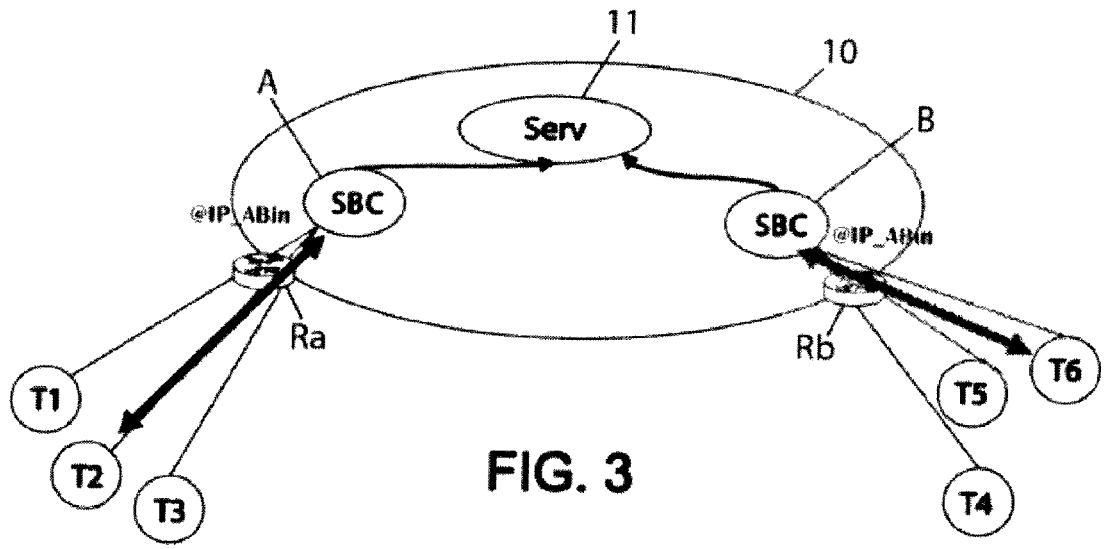
FIGS. 3 and 6 indicate a service management in a bi-lateral operating mode of the invention.

FIG. 3 indicates a network according to an embodiment of the present invention. SBC A, attached to the router Ra, is in charge of the management of client terminals T1 to T3 and SBC B, attached to the router Rb, is in charge of the management of client terminals T4 to T6.

Based on IP routing, as described above, when SBC A and B are operational, each of the routers Ra and Rb has in its routing table a first and a second route for the main address. In this context, the router Ra selects for the address @IP_ABin the route which leads to SBC A and the router Rb selects for this same address the route which leads to SBC B. Thus, the messages transmitted by the client terminals T1-T3 are routed to SBC A and the messages transmitted by terminals T4-T6 are routed to SBC B.

Figure 6:
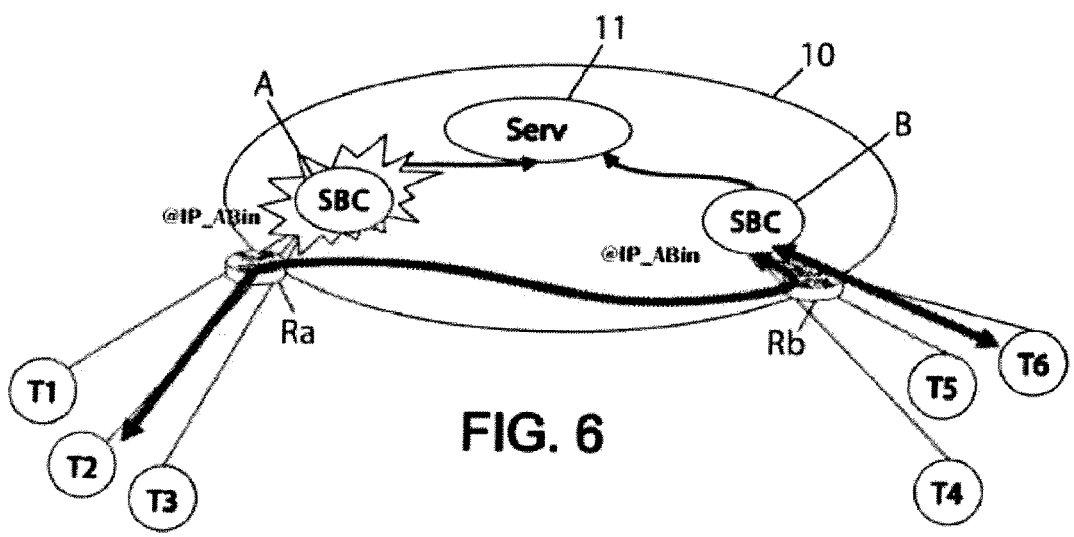

FIG. 6 indicates the application of an embodiment of the present invention when a failure takes place at SBC A in a configuration similar to that indicated in FIG. 3.

When SBC A is considered as operational at the level of the access router of the POP for connection of SBC A, the first route is allocated a higher priority level than that allocated to the second route which corresponds to this same address @IP_ABin, but which leads to the SBC B. As a result, at the level of the access router of the POP of connection of SBC A, the routing process selects the route leading to SBC A.

Following failure of SBC A, the route to the address @IP_AB wherein leads to SBC A is removed from the IP routing process of the router Ra. As a result, a new route for the main address @IP_ABin is selected. The route corresponding to this address @IP_AP wherein then has the highest priority level is that leading to SBC B.

Thus, in case of failure or malfunction of SBC A, the messages transmitted by users T1, T2 and T3 are routed to SBC B.

In another embodiment of the present invention, the SBCs are managed by n-tuples for implementing a distributed operational mode. In this embodiment, the load of the client terminals of a failed SBC can be distributed onto the other SBCs of the same n-tuple.

To this end, the client terminals managed by an SBC are distributed in a whole number M of groups. The SBCs belong to a single n-tuple, supporting the same number of groups M, even if they do not manage the same total number of client terminals. Each of these M groups of client terminals can therefore comprise client terminals the access of which is managed by different POPs and therefore different SBCs.

Separate respective main group addresses, in the incoming direction, are then associated with these M groups. A client terminal then uses the main group address associated with the group to which it belongs, in order to transmit a message to the network 10.

Preferably, all the main group addresses are configured in the incoming direction on all the SBCs of the n-tuple in question, these SBCs ensuring the backup function for each other, according to a distribution which flows from the routing process. Thus, in the incoming direction, each SBC has M main group addresses. Then, in the outgoing direction, each SBC has an output address different to the output addresses of the other SBCs.

Under such conditions, if a given SBC of the n-tuple in question fails, each of the M groups of client terminals which were managed by this given SBC can then be taken in charge by another SBC of the n-tuple as backup SBC.

In this context, it is possible to envisage that not all of the client terminals attached to the failed SBC are taken in charge by the same SBC of the n-tuple in question. In fact the load associated with this failure can advantageously be distributed over different SBCs of the n-tuple, thus avoiding undesirable avalanche effects.

Thus, in such an embodiment of the present invention, the IP network 10 can comprise a n-tuple of four SBCs, SBC A, SBC B, SBC C and SBC D, and POPs which are each organized in three groups of client terminals.

The addresses can then be allocated as follows:
for SBC A: @IP1in, @IP2in, @IP3in, @IP_RTPA, @Aout;
for SBC B: @IP1in, @IP2in, @IP3in, @IP_RTPB, ©Bout;

for SCB C: @IP1in, @IP2in, @IP3in, @IP_RTPC, @Cout; and for SCB D: @IP1in, @IP2in, @IP3in, @IP_RTPD, @Dout where the addresses @IP1in, @IP2in and @IP3in are IP addresses allocated to the interfaces of client terminals of SBCs A, B, C and D for managing the three groups of client terminals by SBC;

where the addresses @IP_RTPX are the addresses for sending and receiving media flows and subsequent requests; and where the addresses @Aout, @Bout, @Cout and @Dout are the respective output addresses.

This distribution is an example configuration which makes it possible to organize each POP in three subgroups of clients. An IP address of the triplet @IP1in, @IP2in and @IP3in is allocated to each subgroup. The addresses @IP_RTPx are addresses specific to each SBC, in the incoming direction, for sending and receiving media flows and subsequent requests.

Such a configuration advantageously makes it possible to distribute the overload due to a failure of an SBC over a plurality of SBCs according to the routing put in place in the IP network 10.

Figure 4:
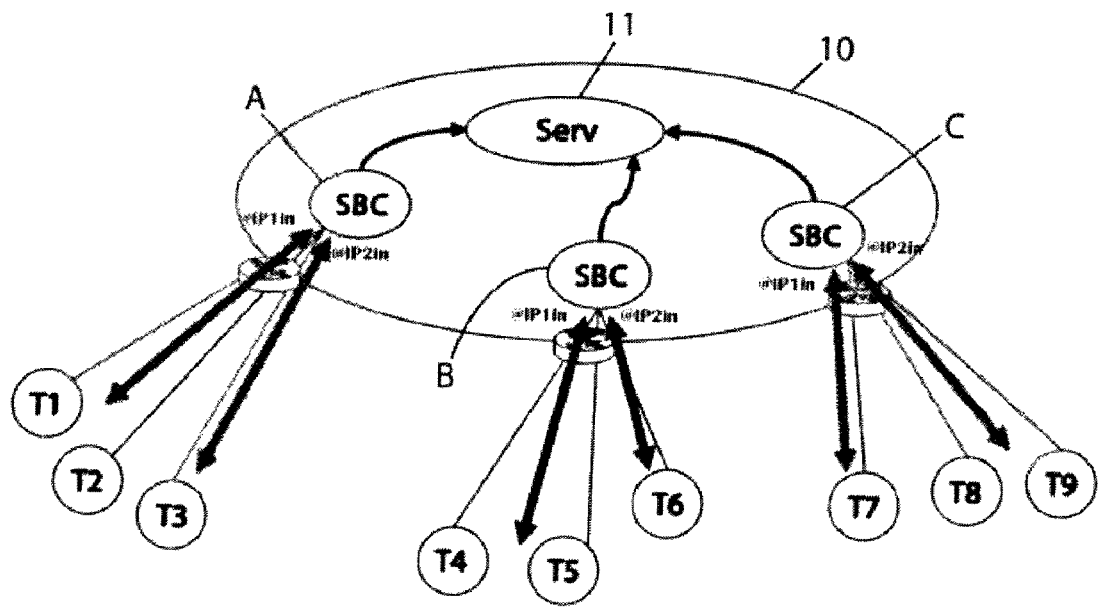
FIGS. 4 and 7 indicate a service management in a distributed operating mode of the invention.

FIG. 4 indicates such an embodiment of the present invention wherein the IP network 10 comprises three SBCs, SBCs A, B and C, respectively managing client terminals T1-T3, T4-T6 and T7-T9 and being attached respectively to three routers Ra, Rb and Rc.

The client terminals of these three SBCs are distributed in two groups with which two main group addresses, @IP1in and @IP2in, are respectively associated. In this context, the main group addresses provided to the users for contacting the service provided in the network are @IP1in for users T1, T2, T4, T5 and T7, and @IP2in for users T3, T6, T8 and T9.

Based on the same routing principles as previously described, routers Ra, Rb and Rc each have in their routing table three routes for each of the main group addresses. When SBCs A, B and C are all operational, router Ra selects the route leading to SBC A, router Rb selects the route which leads to SBC B and router Rc selects the route which leads to SBC C, both for the main address of group @IP1in and the main address of group @IP2in.

Figure 7:
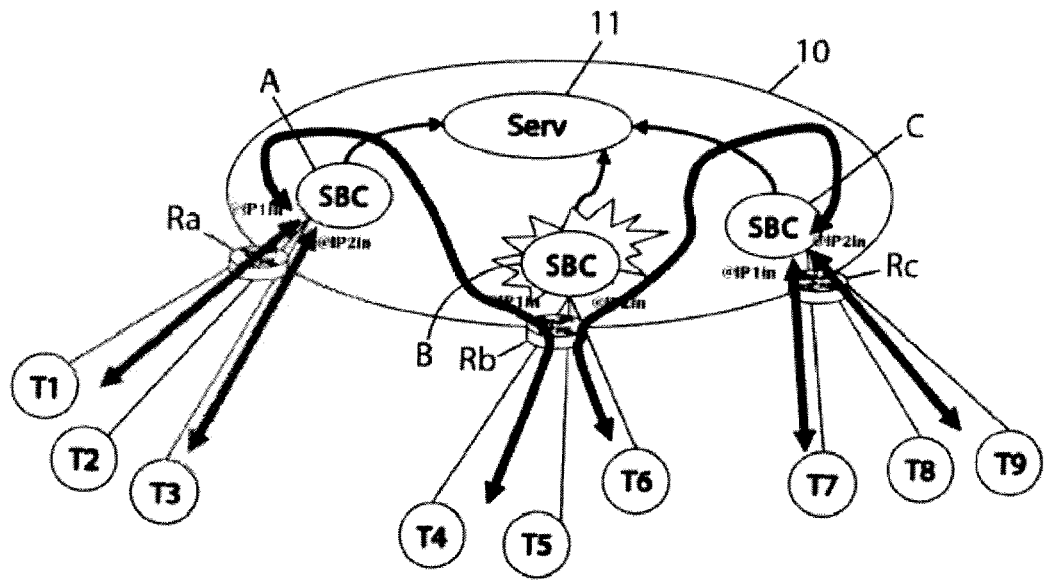

FIG. 7 indicates the application of an embodiment of the present invention when a failure takes place at SBC B in a configuration similar to that indicated in FIG. 4.

The route to @IP1in, respectively @IP2in, which leads to SBC B, is then removed from the IP routing process. The router Rb then selects a new route for this address @IP1in, respectively for the address @IP2in, for users T4 and T5, respectively user T6.

The new route selected can lead to SBC A for the address @IP1in, respectively to SBC C for the address @IP2in. Thus, while SBC B is not operational, client terminals T4 and T5 are managed by SBC A and client terminal T6 is managed by SBC C.

Under these conditions, the overload represented for the other SBCs by the management of the client terminals of a failed SBC is advantageously distributed between the backup SBCs, the groups of client terminals in fact being backed up by different SBCs.

Then, when SBC B becomes operational once again, the route which leads to it from client terminals T4 to T6 is then allocated the highest priority level at the level of the Rb and can be selected again.

Returning to the normal situation relies on the same principles as changing over to the backup SBC or SBCs.

Whatever the mode of operation, whether unilateral, bilateral, distributed or also a combination of these modes, the switchover between the main SBC and backup SBC or SBCS is based preferentially on the detection of a malfunction of the main SBC at the routing level. More precisely, in an embodiment of the present invention, the detection of this malfunction influences the selection of the route attached to the main address of the SBC, from those which are stored in the routing table of the router.

Thus, the switchover from one SBC to another is based on the routing protocol used and its period of implementation is directly linked to the convergence time of this routing protocol.

Such a switchover of SBC can advantageously remain transparent for the client terminals.

In an embodiment of the present invention, the SBCs participate in the routing functions implemented at the level of the router to which it is attached.

To this end, it is provided for the SBC to be capable of implementing the routing protocol implemented by the router, or at least one routing protocol which is compatible with that of the router.

In this context, the SBC transmits a routing announcement message to the router with which it is associated, this message announcing an addition, or also a removal of a route for a main address or also for a secondary address allocated thereto. The announcement of a removal of a route can be made at the time of the detection of failure in the case where the failure affecting the SBC does not affect its capacity to transmit such an announcement message.

In a variant, or in combination, it can be provided for the router to be capable of implementing a protocol for the detection of a failure or malfunction. No limitation is placed on the present invention with the regard to the method used for detecting or also simulating a failure in the IP network 10 between the SBC and its connecting router, the use of the BDF protocol possibly being advantageous for example.

In an embodiment of the present invention, the SBCs are distributed in the network 10 and the main and secondary addresses to be allocated to these SBCs are selected such that, for a client terminal, the route selected by the routing process used to reach an SBC is the one leading to its main SBC, i.e. the SBC associated with the POP which manages its access to the IP network in question, when it is operational.

In case of a failure or malfunction of an SBC, or also in the case where the SBC in question cannot be reached, routing announcements transmitted by this SBC indicate a removal of a route if the SBC implements a routing protocol, or also the router detects that the SBC is out of service, for example by activating the BFD protocol, or a combination of these variants.

In such a configuration in distributed mode, an SBC can be potentially backed up by any other SBC of the n-tuplet wherein it is included.

An embodiment of the present invention makes it possible to control the order wherein the backup SBCs of a single n-tuplet are to be called. It can in fact be beneficial to be able to determine to which backup SBC the first switchover is attempted, then, in the case where this backup SBC is not operational, to which backup SBC the second switchover is attempted, and so on.

It is appropriate to this end to take into account the principles of the routing process for controlling such an order of consultation of the backup SBC in the case of a malfunction of the main SBC, for each group of client terminals and to prepare a routing strategy.

Figure 8:
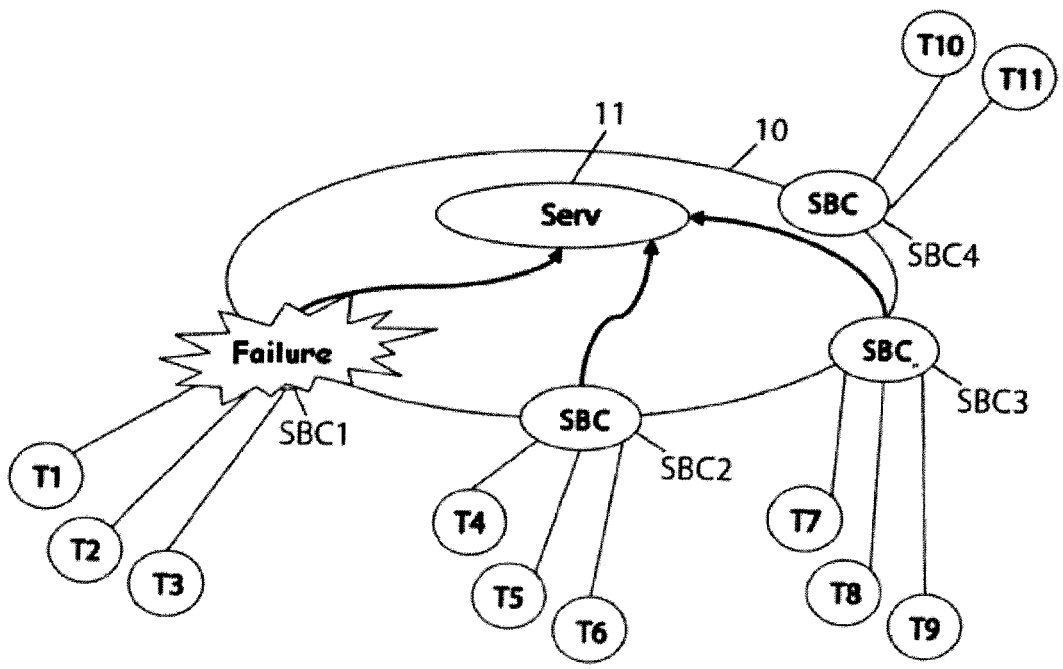
FIG. 8 indicates a plurality of scenarios in a bilateral operating mode of the invention.

FIG. 8 indicates a network 10 comprising four SBCs, SBC 1 which manages client terminals T1-T3, SBC 2 which manages client terminals T4-T6, SBC 3 which manages terminals T7-T9 and SBC 4 which manages client terminals T10 and T11.

SBCs 1 and 4 are configured according to an embodiment of the present invention in bilateral operation mode, i.e. they are a backup SBC for each other. SBC 1 has @IP__14in as its main address, @IP_RTP1 as its media flow address, and @1out as its output address; and SBC 4 has @IP__14in as its main address, @IP_RTP4 as its media flow address and @4out as its output address.

When SBC 1 experiences a malfunction and the re-registration timer of client terminal T1 expires, the client terminal then sends a registration request to the address @IP__14in. This registration request is routed to SBC 4 which proceeds to register this client terminal T1 with the service platform 11. Thus, the service platform 11 records the fact that the client terminal T1 can henceforth be obtained via SBC 4 in the outgoing direction, in order to address future messages to the address @4out.

When the client terminal T2 wishes to make a call to the client terminal T9, it sends a call initiation message to the address @IP__14 wherein is then routed to SBC 4. When this call is initiated before expiry of the re-registration timer of the client terminal T2, SBC 4 does not recognise the client terminal T2. As a result, it sends this terminal a specific error message indicating that prior registration is required.

On receiving this message, the client terminal T2 registers with SBC 4. The client terminal T2 can then re-transmit the message INVITE to the client terminal T9. The call is then processed in a standard fashion.

In another scenario, the client terminal T7 initiates a call to the client terminal 3, which has not yet registered with SBC 4. The service platform 11 then relays the request to the address @1out, which is then transmitted to SBC 1 which is not operational. The call initiation consequently fails.

In this same network, when the client terminal 7 initiates a call to client terminal T3 after the latter has registered with SBC 4, either on expiry of the re-registration timer, or also on failure of an initiated call, the service platform 11 then has information relating to this client terminal 3. It therefore relays the call initiation message to the address @4out. SBC 4 can then transmit it to the client terminal T3. The remainder of the call can therefore take place in a standard fashion.

When SBC1 is operational once again, the same principles can easily be applied in order to return to the initial situation.

Figure 9:
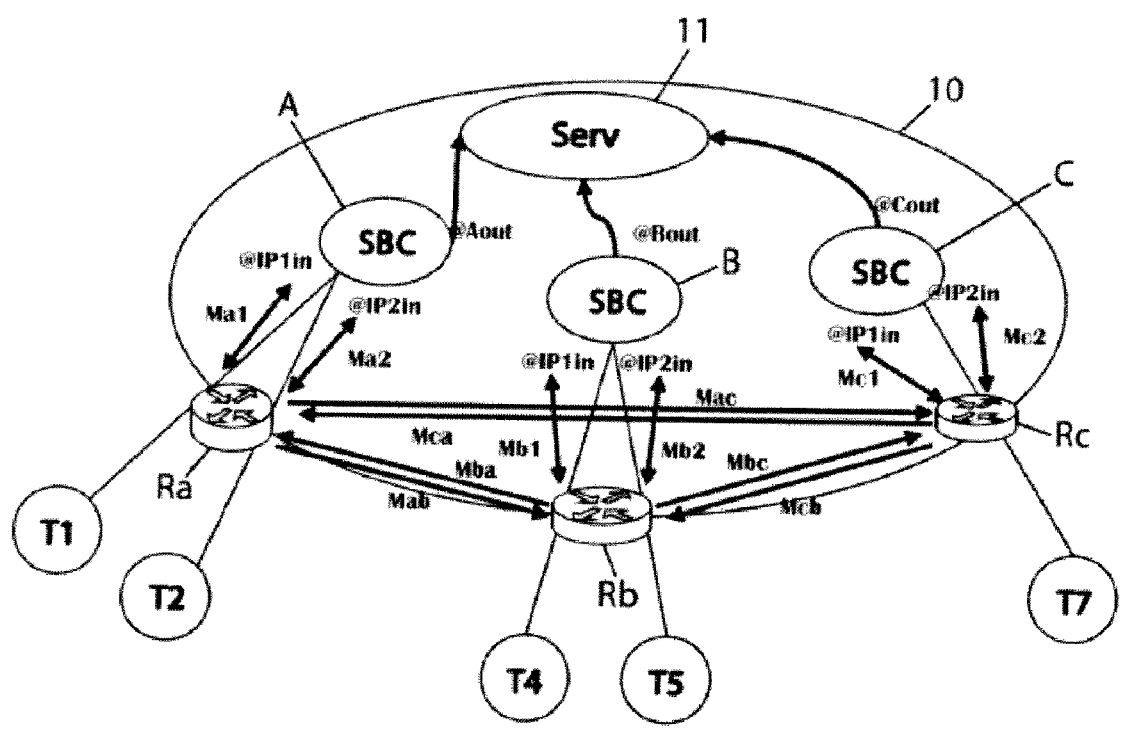
FIG. 9 indicates a distributed operating mode of the invention implementing a metrics strategy.

FIG. 9 indicates an example of the application of the invention in distributed operation mode. The network 10 here comprises SBC A, SBC B and SBC C, of which client terminals T1 and T2, client terminals T4 and T5, and client terminal T7, respectively, are distributed in two groups, a first group comprising client terminals T1 and T4, and a second group comprising client terminals T2, T5 and T7. The main group address associated with the first group is @IP1in and the main address of group associated with the second group is @IP2in.

The following distribution of addresses applies:
for SBC A: @IP1in as main address, @IP2in as secondary address, @IP_RTPA as media flow address, and @Aout as output address;
for SBC B: @IP1in as main address, @IP2in as secondary address, @IP_RTPB as media flow address, and the output address @Bout as output address;
for SCB C: @IP1in as main address, @IP2in as secondary address, @IP_RTPC as media flow address, and @Cout as output address.

SBC A, SBC B and SBC C are attached to their respective connecting routers Ra, Rb and Rc.

The engineering strategy can advantageously rely on using metrics. It can be implemented on the basis of a protocol of the IGP ("Interior Gateway Protocol") type.

Thus Mxy is noted as the metric between SBC X and its router Rx for the main group address of the first group @IPyin, for x corresponding to a, b or c; y corresponding to 1 or 2, and X corresponding to A, B or C.

Mwz is noted as the metric between $R_w$ and $R_z$, where w and z correspond respectively to a, b or c with w≠z.

In order to ensure that, in case of failure of SBC A, the client terminals of group 1 are taken in charge by SBC B as backup SBC, and the client terminals of group 2 are taken in charge by SBC C as backup SBC, it can be provided to allocate the Mxy metrics, such that they fulfill the following conditions, where ">" means "is a better metric than"):

$$Ma1 > Mab + Mb1$$

$$Ma1 > Mac + Mc1$$

$$Ma2 > Mab + Mb2$$

$$Ma2 > Mac + Mc2$$

Moreover, the client terminals of the first group of SBC A, are managed by SBC B as backup SBC when they use the address @IP1in, when the following condition is respected:

$$Mab + Mb1 > Mac + Mc1$$

Based on the case described above with reference to SBC A, similar rules can be deduced for SBCs B and C.

Such metrics rules make it possible, in a distributed mode configuration, to control the call order of the backup SBC by client terminal group, consequently influencing the routing process. However, it should be noted that such a metrics calculation causes an increasing complexity with the number of SBCs per n-tuplet and the number of groups of client terminals.

Starting from the embodiments previously described above, such as the unilateral mode, the bilateral mode or also the distributed mode, it is easy to deduce other advantageous configurations, for example on the basis of combining the different modes. The present invention is not limited to the examples described.

Thus as a result of the arrangements given above, an embodiment of the present invention relying on existing routing systems in IP networks can be simply implemented, while giving a high level of reliability for a reduced cost.

In order to separate the service interfaces and the management interfaces at the level of an SBC, it is also possible to provide for a management address, to be allocated to the SBC such that an SBC emulating a failed service interface can still be obtained via this management address.

Advantageously, an implementation of the present invention does not require an exchange of information between the main SBC and the corresponding backup SBC, the switchover to the backup SBC being possible without notification and substantially automatically.

The present invention allows an organization of backup functions which is much more flexible than the above-mentioned standard plans. This makes it possible in particular to adapter the reliabilization of the architecture and the service in relation to criteria suited to the management of the network in question.

The invention claimed is:

1. A method for managing a service provided to a user of a terminal in a network, the network including at least first and second session border controllers, and a router communicatively coupling the terminal to the first and second session border controllers, the method comprising:
- allocating at least one identical network address to the first and second session border controllers;
- dynamically managing a routing table at the router indicating at least first and second routes for said network address for respective ones of the first and second session border controllers; and
- routing a message transmitted from the terminal intended for said network address from the router to the first session border controller when the router selects the first route and from the router to the second session border controller when the router selects the second route.

2. A service management method according to claim 1, further comprising selecting said second route on detection of a malfunction of the first session border controller.

3. A service management method according to claim 2, wherein the router and the first session border controller implement respectively a similar routing protocol, and wherein detection of the malfunction of the first session border controller is based on routing information exchanged according to at least one of said routing protocols.

4. A service management method according to claim 1, wherein the router implements a failure detection process, and wherein detection of a malfunction of the first session border controller is based on said detection process.

5. A service management method according to claim 1, the network comprising N session border controllers, each one managing M groups of terminals, M network addresses being respectively associated with the M groups of terminals,
- said M network addresses being allocated to each of the N session border controllers, N and M being whole numbers, wherein the routing table of the router indicates N routes for each of the M addresses,
- wherein a message transmitted from the terminal to the network is received at the first session border controller when the router selects the first route and at another session border controller, as the second session border controller, from the N-1 session border controllers when the router selects one of the other routes as the second route.

6. A service management method according to claim 1, wherein the second session border controller is configured to at least:
- receive a call initiation message as the first message from the terminal;
- transmit a specific error message to the terminal; and
- receive a message registering the terminal with said second session border controller.

7. A service management method according to claim 1, wherein a specific address is allocated to the second session border controller, and wherein the second session border controller is configured to:
- receive a call initiation message from the terminal; and
- transmit an information message to the terminal giving said specific address, said following messages transmitted by said terminal being sent to said specific address.

8. A system for managing a service provided to a user of a terminal, said system comprising:
- at least first and second session border controllers, at least one identical network address being allocated to both of the first and second session border controllers; and
- a router communicatively coupling the terminal to the first and second session border controllers and configured to:
  - dynamically manage a routing table indicating at least first and second routes for said network address for respective ones of the first and second session border controllers;
  - route a message transmitted from the terminal to said network address to the first session border controller when the first route is selected at the router; and
  - route the message transmitted from the terminal to said network address to the second session border controller when the second route is selected at the router.

9. A service management method according to claim 2, wherein detection of the malfunction of the first session border controller is based on information exchanged between the router and the first session border controller.

* * * * *